(12) United States Patent
Guerra et al.

(10) Patent No.: US 10,988,314 B2
(45) Date of Patent: Apr. 27, 2021

(54) DRIVE SYSTEM FOR CONVEYORS

(71) Applicant: Lewco, Inc., Sandusky, OH (US)

(72) Inventors: Gerald T. Guerra, Sandusky, OH (US); Albert E. Sparling, Sandusky, OH (US); Charles J. Fresch, Sandusky, OH (US)

(73) Assignee: LEWCO, INC., Sandusky, OH (US)

( * ) Notice: Subject to any disclaimer, the term of this patent is extended or adjusted under 35 U.S.C. 154(b) by 0 days.

(21) Appl. No.: 16/728,330

(22) Filed: Dec. 27, 2019

(65) Prior Publication Data

US 2020/0130937 A1    Apr. 30, 2020

Related U.S. Application Data (63) Continuation of application No. 15/959,509, filed on Apr. 23, 2018, now Pat. No. 10,556,745, which is a continuation of application No. 15/379,479, filed on Dec. 14, 2016, now Pat. No. 9,981,804.

(60) Provisional application No. 62/267,041, filed on Dec. 14, 2015, provisional application No. 62/339,297, filed on May 20, 2016.

(51) Int. Cl.
  *B65G 13/07* (2006.01)
  *B65G 13/11* (2006.01)
  *B65G 47/24* (2006.01)

(52) U.S. Cl.
  CPC .............. *B65G 13/07* (2013.01); *B65G 13/11* (2013.01); *B65G 47/24* (2013.01)

(58) Field of Classification Search
  None
  See application file for complete search history.

(56) References Cited

U.S. PATENT DOCUMENTS

| | | | |
|---|---|---|---|
| 5,769,204 A | 6/1998 | Okada et al. | |
| 6,253,905 B1 * | 7/2001 | Pelka | B65G 47/082 198/415 |
| 6,269,933 B1 | 8/2001 | Schuitema et al. | |
| 7,370,752 B2 | 5/2008 | Neiser et al. | |
| 7,537,107 B2 * | 5/2009 | Hall | B65G 13/07 198/781.03 |
| 8,763,789 B2 | 7/2014 | Wallace | |
| 9,085,422 B2 | 7/2015 | Cristoforetti | |
| 9,550,625 B2 * | 1/2017 | Specht | B65G 13/04 |
| 9,643,784 B2 * | 5/2017 | Guerra | B65G 13/07 |
| 10,093,483 B2 * | 10/2018 | Ramezani | B65G 13/04 |
| 2016/0101943 A1 | 4/2016 | Guerra | |

\* cited by examiner

*Primary Examiner* — Kavel Singh
(74) *Attorney, Agent, or Firm* — Shumaker, Loop & Kendrick, LLP; James D. Miller (57) ABSTRACT

A conveyor system includes a drive assembly and a plurality of rollers configured to singulate a plurality of conveyed articles travelling on the plurality of rollers along a direction of travel. Each of the plurality of rollers having a drive end and a base end. The drive end having a drive sheave including a plurality of grooves and a plurality of peaks interposed between the plurality of grooves formed on a surface thereof. The drive assembly is coupled to the drive end of at least one of the plurality of rollers by a drive belt. At least a first portion of the plurality of rollers is disposed at an angle with respect to the direction of travel.

20 Claims, 7 Drawing Sheets

DRIVE SYSTEM FOR CONVEYORS

CROSS-REFERENCE TO RELATED PATENT APPLICATIONS

This patent application is a continuation patent application of U.S. patent application Ser. No. 15/959,509 filed on Apr. 23, 2018, which claims benefit of U.S. patent application Ser. No. 15/379,479 filed on Dec. 14, 2016, U.S. Provisional Patent Application Ser. No. 62/267,041 filed on Dec. 14, 2015 and U.S. Provisional Patent Application Ser. No. 62/339,297 filed on May 20, 2016, the entire disclosures which are hereby incorporated herein by reference.

FIELD OF THE INVENTION

The invention relates to a conveyor system and more particularly to a singulator conveyor having skewed or angled multi-V belt driven rollers.

BACKGROUND OF THE INVENTION

Commonly, a singulator conveyor system is used for alignment and singulation of packages, goods, and materials. An example of a singulator conveyor system is disclosed in U.S. Pat. No. 5,769,204, hereby incorporated herein by reference in its entirety. For example, the singulator conveyor systems are employed in packaging facilities such as courier facilities so packaging can be identified and automatically processed through sorting equipment. The singulator conveyor systems have skewed, or angled rollers to move the packages to one side of the singulator conveyor system, typically along a guard rail or an edge guide. A technique of gradually increasing a surface speed of the singulator conveyor system is used to create gaps between individual ones of the packages, resulting in the packages being aligned in a single file orientation. The most common singulator conveyor system design incorporates a lower, flat drive belt that contacts the rollers and provides drive through friction. Such a conveyor is identified by the Conveyors Equipment Manufacturers Association (CEMA) as a belt driven live roller conveyor (BDLR).

Because the rollers on the singulator conveyor system are not perpendicular to the side frame, a series of drive motors and drive belts are needed instead of a single drive belt in order to drive the entire length of the singulator conveyor system. The series of drive belts form wear patterns on the rollers. Since the singulator conveyor system requires the series of the drive belts, consequently, there are also a large number of moving parts resulting in significant maintenance efforts and manufacturing costs.

Additionally, as mentioned hereinabove, it is desired to vary the angles of the rollers to cause the randomly oriented articles to form the single file while traveling longitudinally along the singulator conveyor system. However, the angled conveyor rollers form a saw tooth transitional area in the conveyor system. Typically, the transitional areas are formed at an infeed end of the singulator conveyor system and an exit end of the singulator conveyor system. The saw tooth transitional areas are problematic because irregular articles catch, snag, or become otherwise damaged which may result in the blockage of a free flow of articles.

It would therefore be desirable to provide a drive system for a singulator conveyor system wherein an efficiency and a simplicity thereof are maximized and a quantity of drive motors and drive belts is minimized. Additionally, it would be desirable to provide a conveyor system and method of configuring a conveyor system to maintain product orientation and product flow on the conveyor systems.

SUMMARY OF THE INVENTION

Consistent and consonant with the present invention, a drive system for a singulator conveyor system wherein an efficiency and a simplicity thereof are maximized and a quantity of drive motors and drive belts is minimized has surprisingly been discovered. Additionally, a conveyor system and method of configuring a conveyor system to maintain product orientation and product flow on the conveyor systems.

According to an embodiment of the disclosure, a conveyor system includes a drive assembly and a plurality of rollers configured to singulate a plurality of conveyed articles travelling on the plurality of rollers along a direction of travel. Each of the plurality of rollers having a drive end and a base end. The drive end having a drive sheave including a plurality of grooves and a plurality of peaks interposed between the plurality of grooves formed on a surface thereof. The drive assembly is coupled to the drive end of at least one of the plurality of rollers by a drive belt. At least a first portion of the plurality of rollers are disposed at an angle with respect to the direction of travel.

According to another embodiment, a conveyor system is disclosed. The conveyor system includes a drive assembly and a plurality of rollers configured to singulate a plurality of conveyed articles travelling on the plurality of rollers along a direction of travel. Each of the plurality of rollers having a drive end and a base end. The drive end having a drive sheave including a plurality of grooves and a plurality of peaks interposed between the plurality of grooves formed on a surface thereof. The drive assembly is coupled to the drive end of at least one of the plurality of rollers by a drive belt. At least a first portion of the plurality of rollers are disposed at an angle with respect to the direction of travel, wherein a first one of the plurality of peaks of each of the plurality of rollers is offset from a first one of the plurality of peaks of an adjacent one of the plurality of rollers by a number of the plurality of peaks of each of the plurality of rollers. The angle is calculated by the following formula: $\alpha = \tan^{-1}((G_o * P)/R_c)$; wherein $\alpha$ is the angle, $G_o$ is the number of the plurality of peaks between the first one of the plurality of peaks of each of the plurality of rollers and the first one of the plurality of peaks of the adjacent one of the plurality of rollers, P is a distance between adjacent ones of the plurality of peaks, and $R_c$ is a distance between centers of adjacent ones of the rollers. A frame assembly has a first side, a second side, a conveyor system infeed, and a conveyor system exit. The plurality of rollers are coupled to the frame assembly. A plurality of torque transmitters engage the plurality of grooves of the drive end of the plurality of rollers.

According to yet another embodiment, a method of configuring a roller conveyor system is disclosed. The method includes the steps of: providing a frame assembly having a conveyor system infeed, a conveyor system exit, a first side, and a second side; providing a plurality of rollers mounted to the frame, each of the plurality of rollers having a drive sheave coupled to an end thereof, the drive sheave having a plurality of grooves interposed between a plurality of peaks formed thereon; rotating the plurality of rollers with a torque applied by a plurality of torque transmitters engaging the drive sheaves and a drive assembly, the plurality of rollers rotating to convey an article along a direction of travel from the conveyor system infeed to the conveyor system exit;

positioning a first portion of the plurality of rollers at an angle with respect to the direction of travel; and calculating the angle with the following formula: $\alpha = \tan^{-1}((G_o * P)/R_c)$, wherein $\alpha$ is the angle, $G_o$ is the number of the plurality of peaks between the first one of the plurality of peaks of each of the first portion of the plurality of rollers and the first one of the plurality of peaks of the adjacent one of the first portion of the plurality of rollers, P is a distance between adjacent ones of the plurality of peaks, and $R_c$ is a distance between centers of the adjacent ones of the first portion of the rollers.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawing which:

FIG. 4 is a bottom perspective view of a guard of the conveyor system of FIG. 3;

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
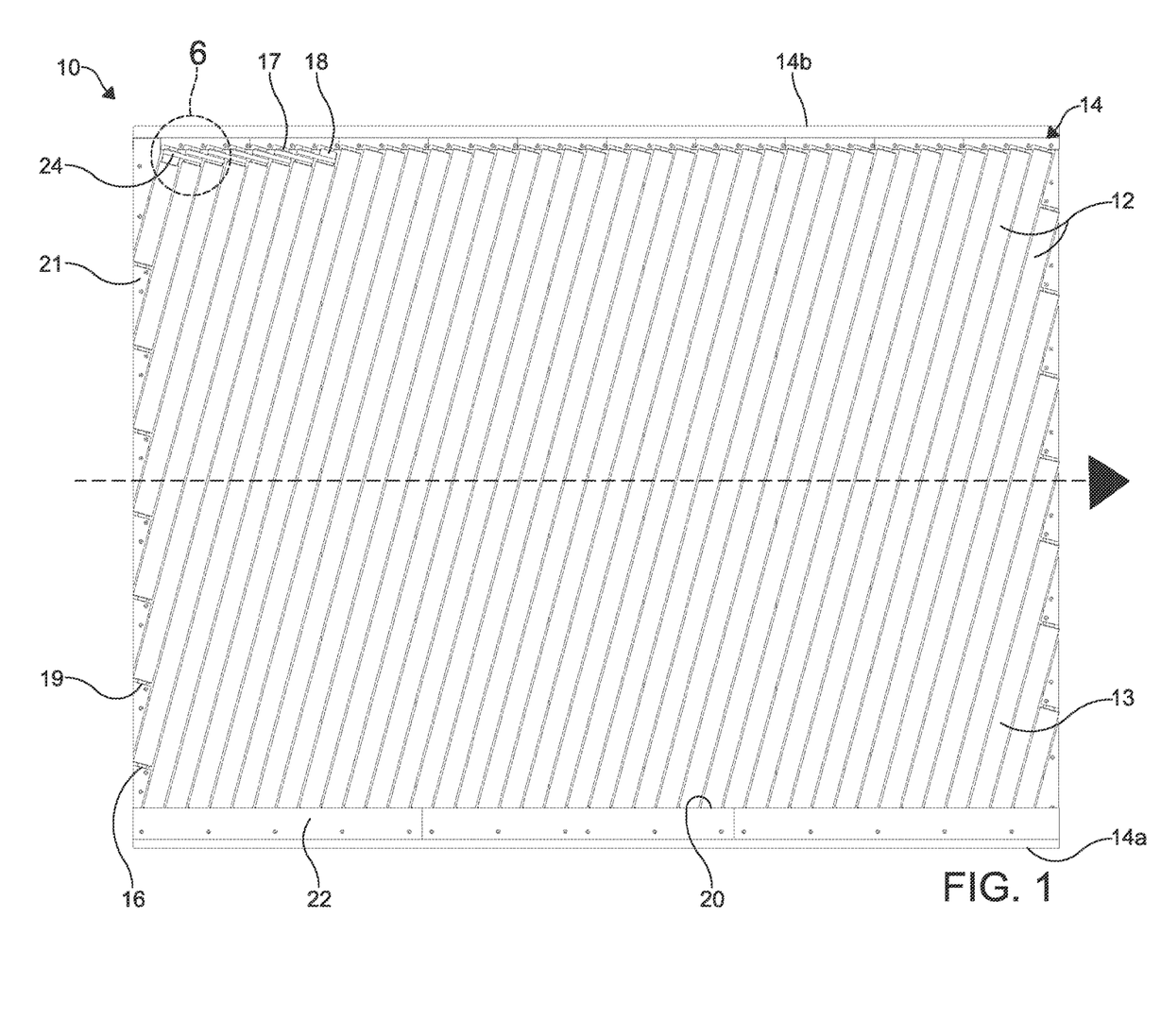
FIG. 1 is a top plan view of a conveyor system according to an embodiment of the disclosure.

FIG. 1 illustrates a conveyor system 10 according to an embodiment of the present disclosure. The conveyor system 10 includes a plurality of tubular conveyor rollers 12. The rollers 12 are rotatingly mounted at preset intervals within a frame assembly 14. The rollers 12 cooperate with each other to form a bed surface 13 for conveying a material or good (hereinafter "conveyed article"), such as a package or product, for example, in a direction of travel, along the conveyor system 10 as indicated by the solid arrow. As used herein, the term "direction of travel" is a path taken by the conveyed article along a length or curvature of the conveyor assembly 10 from the conveyor system infeed 9 to the conveyor system outlet 11. As shown, the direction of travel is substantially parallel to a first side 14a and a second side 14b of a linear frame assembly and substantially concentric with the first side 14a and the second side 14b of an arcuate frame assembly. A first end 16 of the rollers 12 is mounted to the first side 14a of the frame assembly 14 and a second end 18 is mounted to the second side 14b of the frame assembly 14.

The conveyor system 10 is configured as a singulation type conveyor. As described herein, a singulation type conveyor refers to a conveyor configured to receive randomly oriented and positioned ones of the conveyed articles and orient and/or align the conveyed articles in a desired configuration or pattern such as single file along the direction of travel. By positioning and orienting the conveyed articles, the conveyed articles can be conveyed to another conveyor system or other assembly line system or facility one at a time, for example. In other examples, the conveyed articles conveyed in a single file can be more efficiently scanned, tagged, tracked, observed for quality, or otherwise manipulated or observed. In order to orient and align the conveyed articles into a single file, at least some of the rollers 12 are skewed, or disposed at an angle, with respect to the direction of travel or with respect to the first side 14a of the frame assembly 14 and the second side 14b of the frame assembly 14.

The skewed rollers 12 cause the conveyed articles to move towards a trailing one of the ends 16, 18 of the rollers 12. For example, as illustrated in FIG. 1, the trailing one of the ends 16, 18 is the first end 16, wherein the first end 16 "trails," or is disposed at a distance behind, the second end 18 with respect to the direction of travel of the conveyor system 10. In certain embodiments, such as shown in FIG. 1, the rollers 12 are skewed to urge the conveyed articles towards a guide edge 20. In FIG. 1, the guide edge 20 is a side surface of a guard 22. However, in it is understood, that the guide edge 20 can be a guide rail separate from the guard 22, a portion of the frame assembly 14, or any other component commonly employed with conveyor systems to guide the conveyed article along the conveyor system 10, as desired.

As shown in FIG. 1, the rollers 12 of the conveyor system 10 are arranged in an edge alignment configuration. The edge aligning configuration includes a row 12a of the rollers 12 that extend a width of the frame assembly 14. As the conveyed articles travel along the direction of travel, the conveyed articles are directed towards the guide edge 20. The conveyed articles travel in single file along the direction of travel along the guide edge 20.

Figure 2:
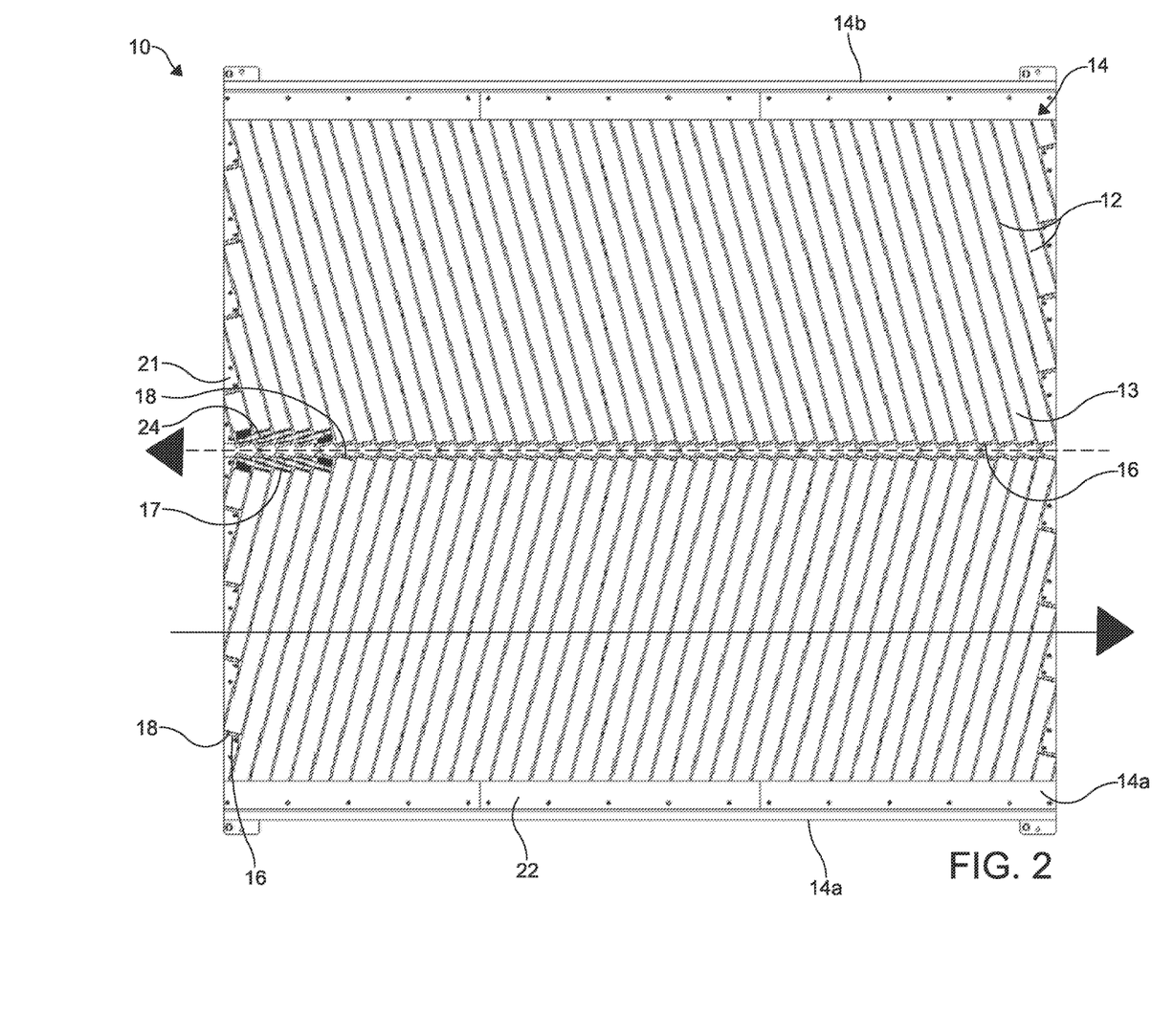
FIG. 2 is a top plan view of a conveyor system according to another embodiment of the disclosure.
Figure 3:
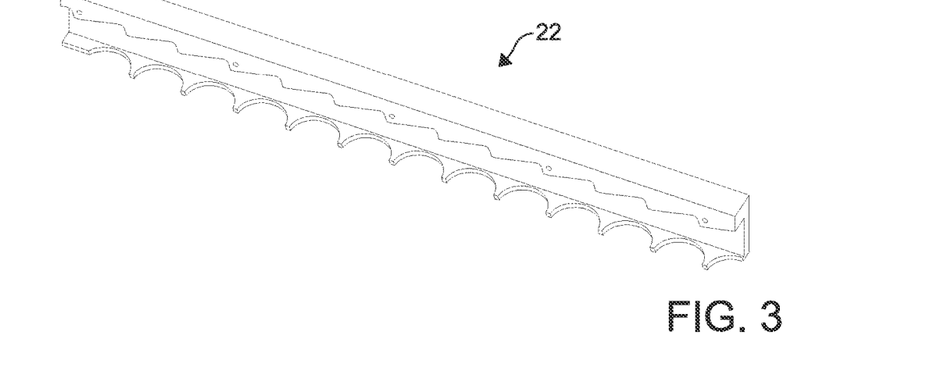
FIG. 3 is a bottom perspective view of a guard of the conveyor system of FIG. 1.
Figure 4:
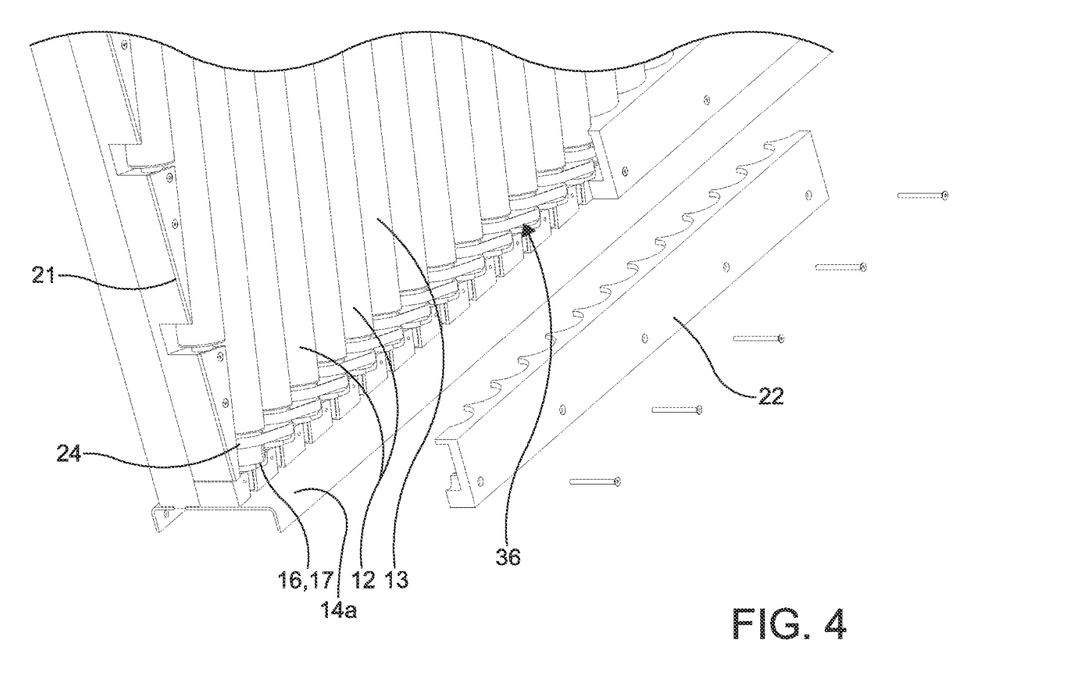
FIG. 4 is a fragmentary partially exploded top perspective view of the conveyor system of FIG. 1, wherein a portion of a conveyor system infeed and a first side of the conveyor system is shown.
Figure 5:
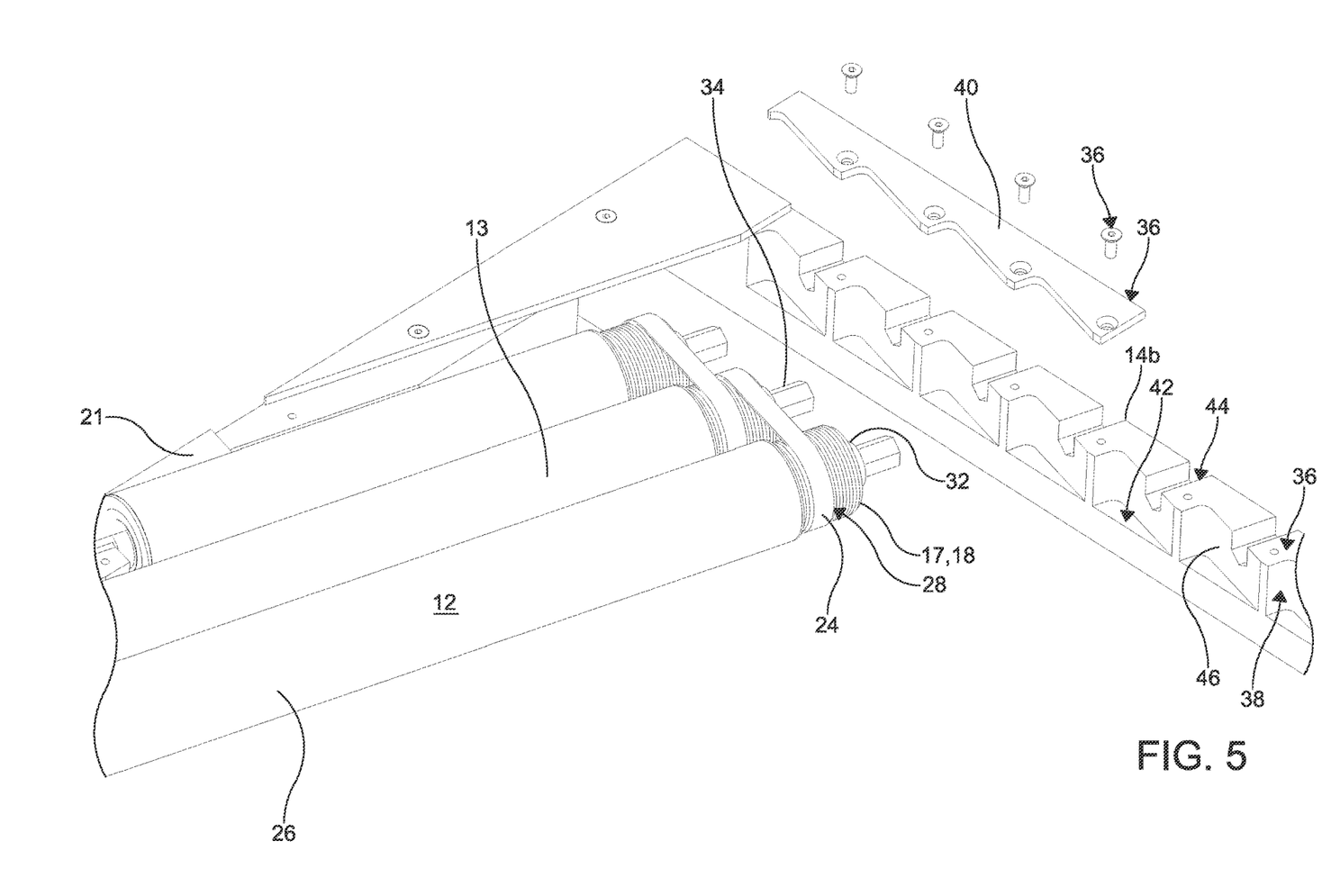
FIG. 5 is a fragmentary partially exploded top perspective view of rollers and a bracket assembly of the conveyor system of FIG. 1, wherein a portion of a conveyor system infeed and second side of the conveyor system is shown.
Figure 6:
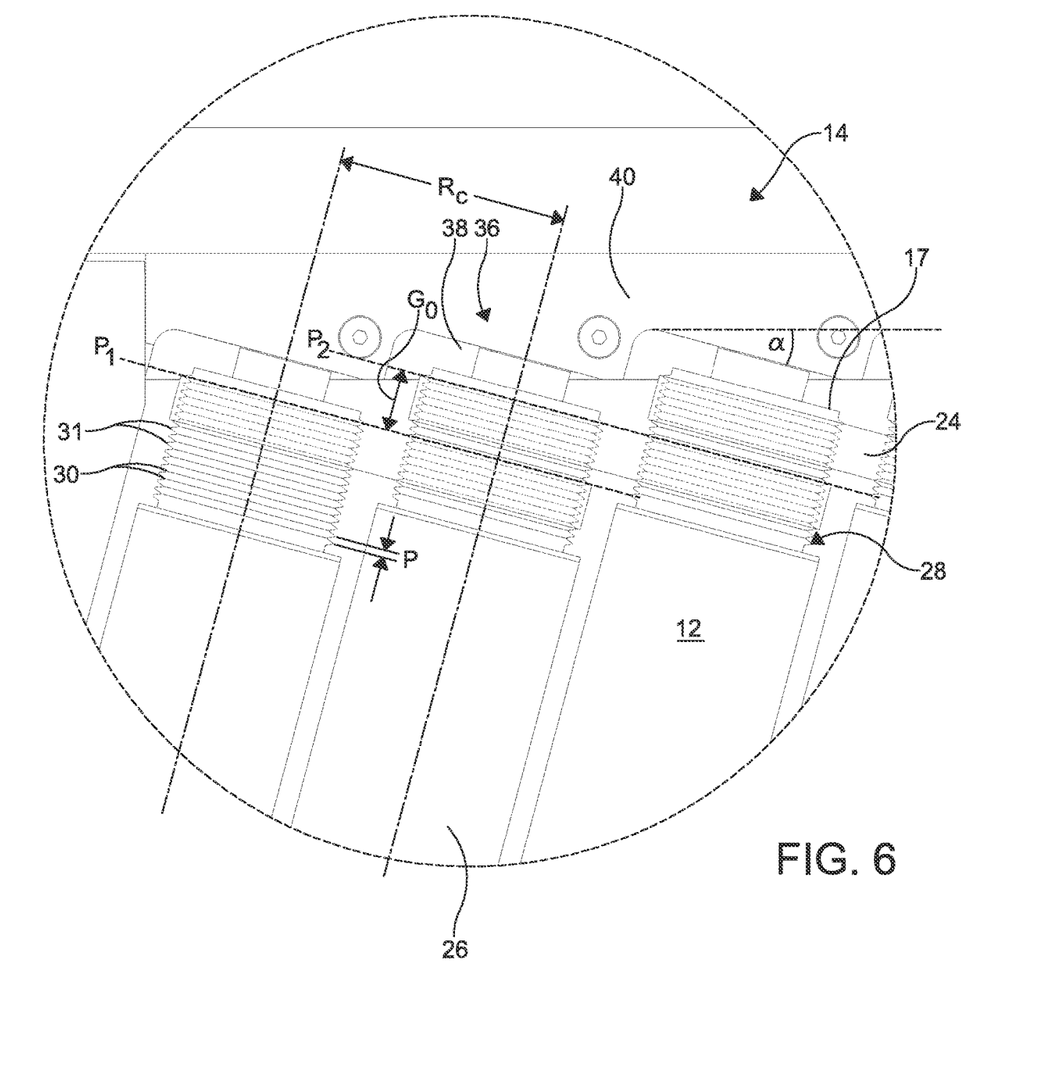
FIG. 6 is a fragmentary top plan view of rollers coupled to a bracket assembly of the conveyor system of FIG. 1, highlighted by circle 6.
Figure 7:
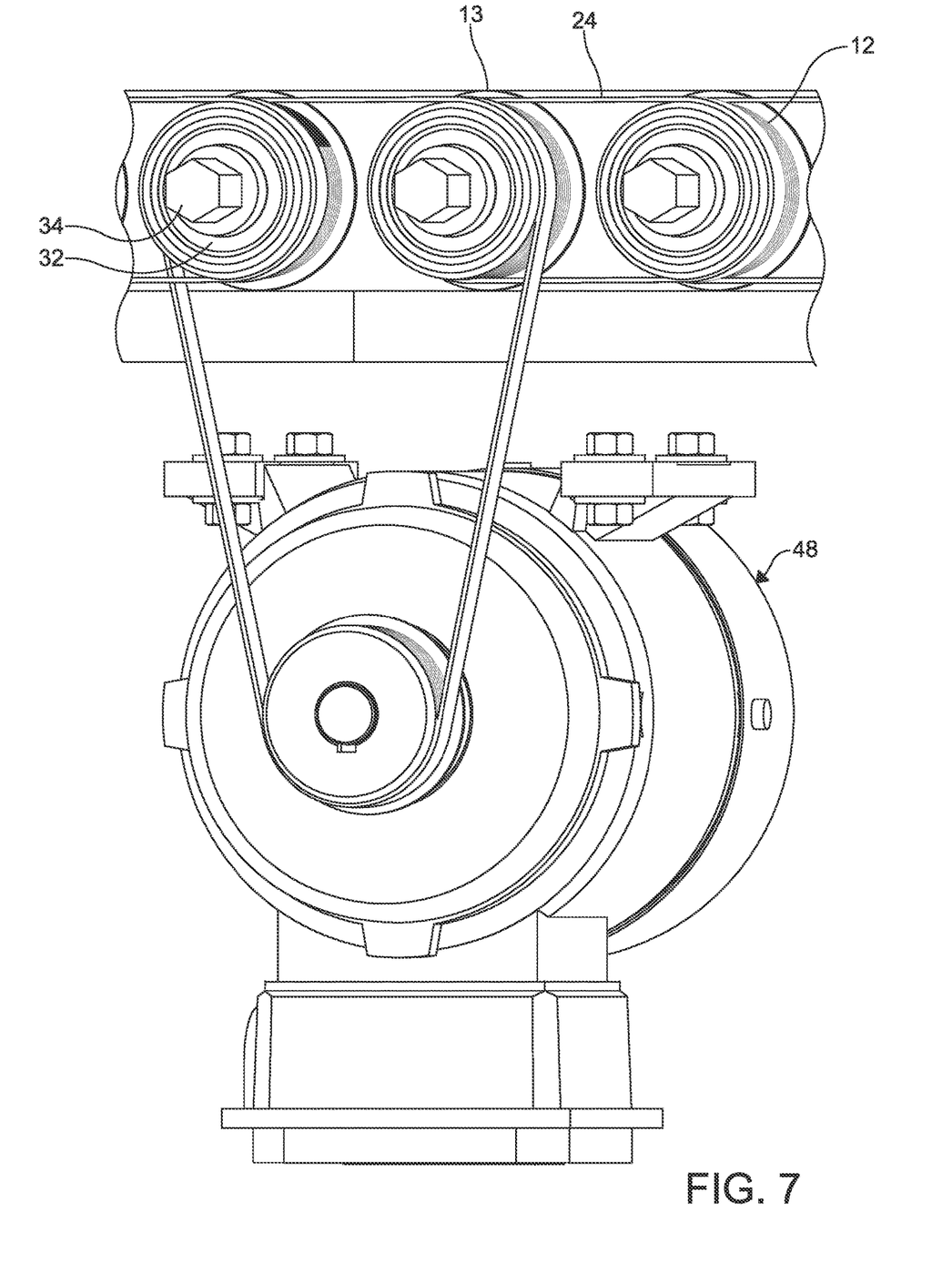
FIG. 7 is a fragmentary left side perspective view of a drive assembly mechanically communicating with rollers of the conveyor system of FIG. 1.

However, as illustrated in FIG. 2 with reference to the dashed arrow, the rollers 12 of the conveyor system 10 are arranged in a merge alignment configuration. In the merge alignment configuration, the conveyor system infeed 9 and the conveyor system exit 11 is indicated by the dashed reference numerals 9, 11. The merge alignment configuration includes a pair of rows (the first row 12a, a second row 12b) of the rollers 12 extending the width of the frame assembly 14, wherein the conveyor system 10 includes a pair of the guide edges 20. The rollers 12 in the first row 12a are skewed at a first angle with respect to the direction of travel, wherein the rollers 12 in the first row 12a slope towards an intermediate portion, away from the first side 14a, of the frame assembly 14 between the first side 14a and the second side 14b of the frame assembly 14 (i.e. the trailing one of the ends 16, 18 of the rollers 12 is adjacent the intermediate portion of the frame assembly 14). The first end 16 of the rollers 12 in first row 12a are coupled to the first side 14a of the frame assembly 14 and the second end 18 of the rollers 12 in the first row 12a are coupled the intermediate portion of the frame assembly 14. The rollers 12 in the second row 12b are skewed at a second angle with respect to the direction of travel, wherein the rollers 12 in the second row 12b slopes towards the intermediate portion away from the second side 14b, of the frame assembly 14 (i.e. the trailing one of the ends 16, 18 of the rollers 12 is adjacent the second side 14b of the frame assembly 14). The first end 16 of the rollers 12 in second row 12b are coupled to the first side 14a of the frame assembly 14 and the second end 18 of the rollers 12 in the second row 12b are coupled to the intermediate portion of the frame assembly 14. In the merge alignment configuration, the rollers 12 form a chevron or herringbone shape. In certain embodiments, the first angle and the second angle are equal. However, it is understood, the angles can be unequal, if desired. In the merge alignment configuration, the conveyed articles are urged towards the intermediate portion in a single file line along the intermediate portion as the conveyed articles travel along the direction of travel.

As illustrated in FIG. 2, with reference to the solid arrow, the rollers 12 of the conveyor system 10 are arranged in a dual edge alignment configuration. In the dual edge configuration, the conveyor system infeed 9 and the conveyor system exit 11 is indicated by the solid reference numerals 9, 11. In the dual edge alignment configuration, the conveyed articles are urged towards both the first side 14a of the frame assembly 14 and the second side 14b of the frame assembly 14 and travel in a double file line along the direction of travel along the guide edges 20.

In the dual edge alignment configuration, the rollers 12 in the first row 12a are skewed at a first angle with respect to the direction of travel, wherein the rollers 12 in the first row 12a slope towards the first side 14a of the frame assembly 14 (i.e. the trailing one of the ends 16, 18 of the rollers 12 is adjacent the first side 14a of the frame assembly 14). The first end 16 of the rollers 12 in first row 12a are coupled to the first side 14a of the frame assembly 14 and the second end 18 of the rollers 12 in the first row 12a are coupled to the intermediate portion of the frame assembly 14. The rollers 12 in the second row 12b are skewed at a second angle with respect to the direction of travel, wherein the rollers 12 in the second row 12b slopes towards the second side 14b of the frame assembly 14 (i.e. the trailing one of the ends 16, 18 of the rollers 12 is adjacent the second side 14b of the frame assembly 14). The first end 16 of the rollers 12 in second row 12b are coupled to the second side 14b of the frame assembly 14 and the second end 18 of the rollers 12 in the second row 12b are coupled the intermediate portion of the frame assembly 14. In the dual edge alignment configuration, the rollers 12 form a chevron or herringbone shape. In certain embodiments, the first angle and the second angle are equal. However, it is understood, the angles can be unequal, if desired.

In the edge alignment configuration, the merge alignment configuration, or the dual edge alignment configuration, the rollers 12 in each of the rows 12a, 12b adjacent the conveyor system infeed 9 and the conveyor system exit 11 have a length less than the length of the rollers 12 intermediate the conveyor system infeed 9 and the conveyor system exit 11. The shorter length accommodates for the skewed rollers 12 ending at the conveyor system infeed 9 and the conveyor system exit 11 which are perpendicular to the direction of travel. To properly transition from the conveyor system 10 to another conveyor system, a saw toothed edge 21 is formed at the conveyor system infeed 9 and the conveyor system exit 11 to receive one of the ends 16, 18 of the rollers 12 with the shorter lengths.

In FIGS. 1-4, either the first end 16 or the second end 18 of the rollers 12 is configured as a drive end 17. An opposing one of the ends 16, 18 is configured as a base end 19. In the embodiments illustrated, the drive end 17 for each of the rollers 12 in the rows 12a, 12b are either at the first end 16 adjacent the first side 14a of the frame assembly 14 or the second end 18 adjacent the second side 14b of the frame assembly 14. It may be desired to avoid positioning the drive end 17 against the saw toothed edge 21. It is understood, any configuration of rollers 12 and positioning of the drive end 17 can be contemplated, as desired, depending on design parameters of the conveyor system 10.

The drive end 17 is configured to engage with torque transmitters 24 configured as multi-V conveyor belts. In the embodiment illustrated, the torque transmitters 24 engage a pair of the rollers 12 to transmit torque from a first one of the pair of the rollers 12 to a second one of the pair of the rollers 12. However, it is understood, the torque transmitters 24 can be employed to transmit torque directly from a drive assembly 48, which will be described in further detail herein below. Each of the torque transmitters 24 includes a plurality of V-shaped protuberances (not shown) formed on an inner surface thereof.

The guards 22 of the frame assembly 14 are configured to cover portions of the rollers 12 to militate against access to nip points and sharp edges and in accordance with safety requirements, for example. For example, the guards 22 may be positioned along the first side 14a of the frame assembly 14 to cover the drive end 17 of the rollers 12 and torque transmitters 24 (as shown in FIG. 1) or the second side of the frame assembly 14 to cover the drive end 17 of the rollers 12 (as shown in FIG. 2). It is understood, the guards 22 can also be positioned along the intermediate portion of the frame assembly 14 (not shown) to cover the drive ends 17 and base ends 19 of the rollers 12, as desired. The guards 22 are contoured to correspond to a contour of the rollers 12.

As shown in FIGS. 3-7, each of the rollers 12 can be any conveyor roller configured for use with roller conveyors. Each of the rollers 12 includes an outer tube 26 and a drive sheave 28 disposed at the drive end 17 of the roller 12. The drive sheave 28 can be integrally formed with the outer tube 26, separately formed as an end cap and attached to the outer tube 26, or separately formed as a sleeve and received on an outer surface of the outer tube 26. It is understood, the drive sheave 28 can be coupled to or formed at the drive end 17 of the roller 12 in any manner as desired now known or later developed. According to one example, the rollers 12 are configured as POLY-V® brand multi-V belt driven rollers.

The drive sheave 28 includes a plurality of grooves 30 intermediate a plurality of peaks 31 formed on an outer surface thereof. The grooves 30 are circumferentially formed on the outer surface of the drive sheave 28. The grooves 30 engage with the torque transmitter 24 while being either directly driven or indirectly slave driven by the drive assembly 48. The grooves 30 are configured as a plurality of grooves concentric with respect to the drive sheave 28. The grooves 30 correspond in shape with a shape of the V-shaped protuberances formed on the torque transmitters 24. Any number of the grooves 30 can be included such as 17 grooves or 9 grooves or any number of grooves corresponding to the number of V-shaped protuberances formed on the torque transmitters 24 engaging with the rollers 12.

The rollers 12 further include a bearing assembly 32 disposed at the drive end 17 of the rollers 12 and a shaft 34 extending longitudinally through the outer tube 26 and the bearing assembly 32 and outwardly from the ends 16, 18 of the rollers 12. Other components commonly employed with the rollers 12 can also be included without departing from the scope of the disclosure.

Each of the ends 16, 18 of the rollers 12 are mounted to a bracket assembly 36 coupled to or integrally formed with the frame assembly 14 and extending parallel with the direction of travel. The bracket assembly 36 has a support member 38 and a cover plate 40. The support member 38 includes a plurality of first recesses 42 for receiving at least a portion of the ends 14, 16 of the rollers 12 and a plurality of second recesses 44 for receiving the shafts 34 extending outwardly from the ends 14, 16 of the rollers 12. The support member 38 includes a plurality of angled surfaces 46 defining a portion of the first recesses 42. The angled surfaces 46 face one of the ends 16, 18 of the rollers 12 and are substantially parallel with an end surface of one of the ends 16, 18 of the rollers 12 being received in the support member 38. The angled surfaces 46 are disposed at an angle α with respect to the direction of travel and the sides of the frame assembly 14. The angled surfaces 46 are configured to position the rollers 12 at the angle α.

The angle α is determined by an offset groove distance $G_o$, a distance between adjacent ones of the peaks P, and a distance between roller centers $R_c$. The groove offset distance $G_o$ is a distance between initial groove peak $P_1$ (the first peak 31 adjacent the drive end 17 of the roller 12) of one of the rollers 12 and initial groove peak $P_2$ (the first peak 31 adjacent the drive end 17 of the roller 12) of an adjacent roller 12 in the direction of travel of the conveyor system 10. It is desired to position adjacent ones of the rollers 12 so the peaks 31 between the grooves 30 of the adjacent ones of the rollers 12 substantially align along parallel planes. The groove offset distance $G_o$ can be any integer value from a range of the number of the grooves 30 formed in the drive sheave 28 minus the number of the grooves 30 reserved for engaging the torque transmitters 24. The distance between adjacent ones of the peaks P is a predetermined value dependent on the type of multi-V type torque transmitters 24 employed. The distance between roller centers $R_c$ is a predetermined value dependent on the multi-V type torque transmitters 24 being employed and is critical to obtaining a desired tension in the torque transmitters 24 during operation of the conveyor system 10. The equation using the variables to determine the angle α is:

$$(\tan(\alpha) * R_c)/P = G_o$$

or $$\alpha = \tan^{-1}((G_o * P)/R_c)$$

For example, an ISO 9982:1998(E) PH series torque transmitter is employed with rollers having the distance between the adjacent ones of the peaks P equal to 0.063 inches and the distance between roller centers $R_c$ equal to 1.5 inches. Selecting the offset groove distance $G_o$ to be 9, and with the equation, the angle α is 20.7 degrees.

Example: $\alpha = \tan^{-1}((G_o * P)/R_c) = \tan^{-1}((9*0.063)/1.5) = 20.7$ degrees In another example, an ISO 9982:1998(E) PH series torque transmitter is employed with rollers having the distance between the adjacent ones of the peaks P equal to 0.063 inches and the distance between roller centers $R_c$ equal to 1.5 inches. Selecting the offset groove distance $G_o$ to be 6, and with the equation, the angle α is 14.1 degrees.

Example: $\alpha = \tan^{-1}((G_o * P)/R_c) = \tan^{-1}((6*0.063)/1.5) = 14.1$ degrees In another example, an ISO 9982:1998(E) PJ series torque transmitter is employed with rollers having the distance between the adjacent ones of the peaks P equal to 0.092 inches and the distance between roller centers $R_c$ equal to 2.75 inches. Selecting the offset groove distance $G_o$ to be 8, and with the equation, the angle α is 15 degrees.

Example: $\alpha = \tan^{-1}((G_o * P)/R_c) = \tan^{-1}((*0.092)/2.75) = 15$ degrees In yet a further example, an ISO 9982:1998(E) PJ series torque transmitter is employed with rollers having the distance between the adjacent ones of the peaks P equal to 0.092 inches and the distance between roller centers $R_c$ equal to 2.75 inches. Selecting the offset groove distance $G_o$ to be 11, and with the equation, the angle α is 20.2 degrees.

Example: $\alpha = \tan^{-1}((G_o * P)/R_c) = \tan^{-1}((11*0.092)/2.75) = 20.2$ degrees The angle α calculated in the examples is approximate and may be rounded to the nearest tenth of a degree. It is understood any values, dependent on the rollers employed, the desired torque transmitter, and the offset distance selected, can be used to determine the value of the angle α.

The rollers 12 are received in the support member 38, wherein the portions of the ends 16, 18 of the rollers 12 are received in the first recesses 42 and the shafts 34 of the rollers 12 are received in the second recesses 44. The cover plate 40 is coupled to an upper surface of the support member 38 to maintain the rollers 12 within the bracket assembly 36. In the embodiment illustrated, the cover plate 40 has a zigzag shape to correspond to the upper surface of the support member 38. The cover plate 40 covers the shafts 34 received in the second recesses 44 and exposes the portion of the ends 16, 18 received in the first recesses 42. The exposed ones of the ends 16, 18 permit access to the drive ends 17 and to the torque transmitters 24 for inspection and/or maintenance. The guards 22 can be positioned over the cover plate 40 or in lieu of the cover plate 40.

The conveyor system 10 can be any conveyor system used with rollers 12 configured to convey the conveyed articles. For example, the conveyor system 10 is configured as a live roller conveyor wherein the drive assembly 48 is in mechanical communication with at least one of the rollers 12 to provide torque automatically to the rollers 12. The drive assembly 48 is configured as a conveyor drive assembly and can include drive assembly components such as a motor, a speed reducer, a drive pulley, sprockets, guards, and other components commonly employed with the conveyor drive assembly such as a drive shaft, for example.

It is understood the conveyor system 10 with the angled rollers 12 and the method of calculating the angle α of the rollers 12 can be provided with a linear frame assembly 14 as shown in FIGS. 1-7 or in a arcuate frame assembly (not shown). An additional calculation accounting for an arc length or angle of curvature of the arcuate frame assembly may be factored into the equation in certain applications. In the embodiment, the rollers 12 are parallel to each other. However, the conveyor system 10 can include non-parallel rollers 12 to form curved portions of the conveyor system 10. The conveyor system 10 can be configured to cooperate with other conveyor beds and types depending on the application, if desired.

Advantageously, the conveyor system 10 as described hereinabove employs a single drive assembly 48 per series of the rollers 12 minimizing the need to employ multiple drive assemblies 48 and/or components. The conveyor system 10 also minimizes the maintenance required and ease of access to components of the conveyor system 10 for maintenance and installation. Additionally, a complexity and cost of the conveyor system 10 is minimized. The equation to determine the angle α accounts for the dimensions of the torque transmitters 24 to assure proper tensioning of the torque transmitters 24 between the adjacent ones of the rollers 12 to properly drive the rollers 12 of the conveyor system 10.

Figure 8:
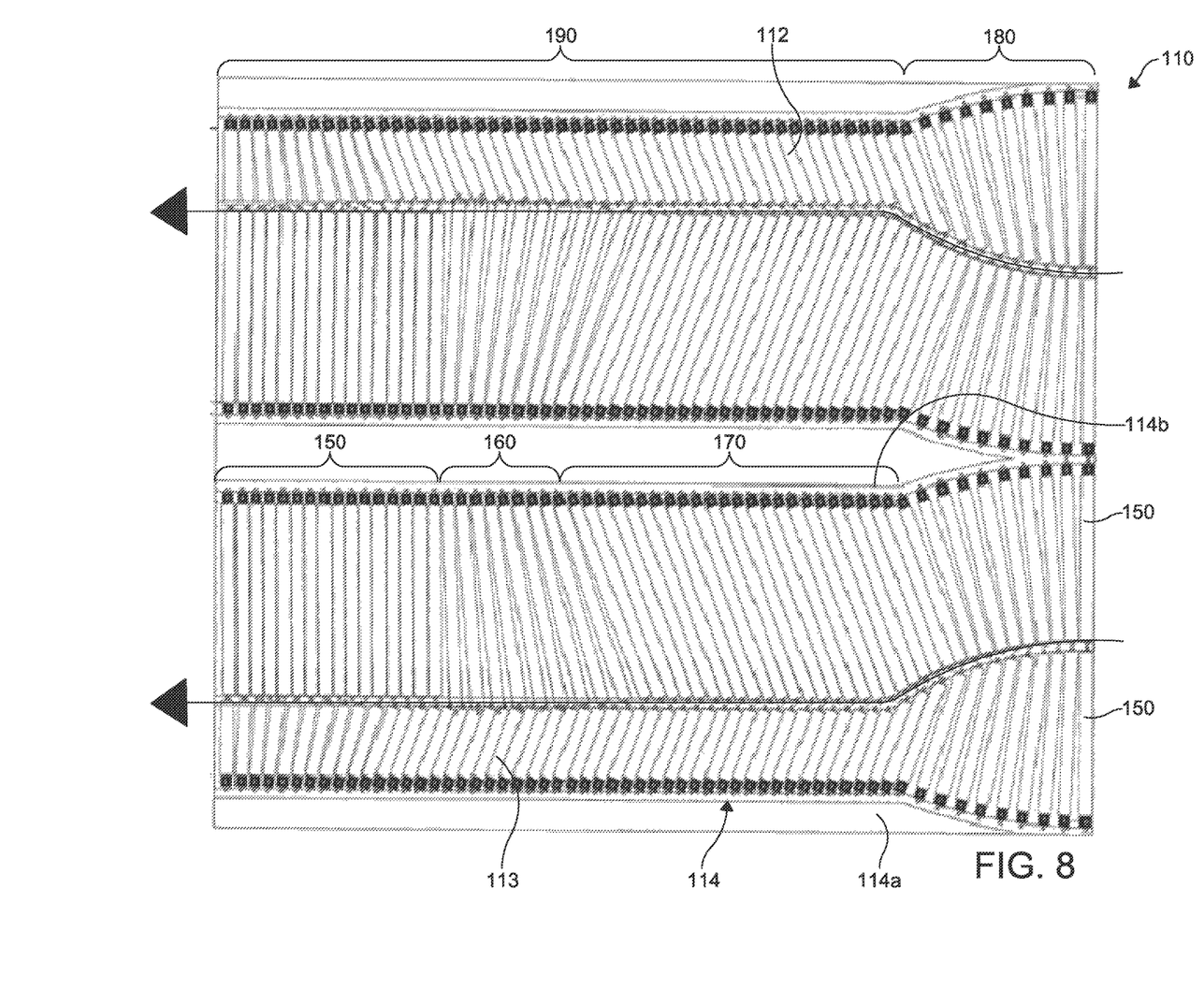
FIG. 8 is a top plan view of a conveyor system according to another embodiment of the the disclosure.

In FIG. 8, a conveyor system 110 according to another embodiment is illustrated. The conveyor system 110 of FIG. 8 is substantially similar to the conveyor system 10 shown and described in FIGS. 1-7, except the saw toothed edges 21 are eliminated. Features similar to the conveyor system 10 of FIGS. 1-7 are shown with the same reference numeral but with a "1" preceding the reference numeral for convenience. For certain applications, wherein the conveyed articles may get caught or jammed against the saw toothed edges 21, it may be desired to employ a smoother transition to the conveyor system infeed 109 and the conveyor system exit 111. Therefore, a series 150 of the rollers 112 adjacent the conveyor system infeed 109 and the conveyor system exit 111 are substantially parallel therewith, or alternatively, substantially perpendicular to the direction of travel or the sides 14a, 14b of the frame assembly 114. A transition series 160 of the rollers 112 from the series 150 of the rollers 112 adjacent the conveyor system infeed 109 and the conveyor system exit 111 to a skewed series 170 of the rollers 112 disposed at the angle α is required. Additionally, it may be desired to employ the transition series 160 of the rollers 112 to transition from an arcuate section 180 of the frame assembly 114 to a linear section 190 of the frame assembly 114.

The transition series 160 of the rollers 112 are disposed intermediate the series 150 of the rollers 112 adjacent the conveyor system infeed 109 and the skewed series 170 of rollers 112. The transition series 160 of the rollers 112 are subsequently disposed at 2 degree increasing angle increments, with respect to the direction of travel, from the series 150 of the rollers 112 adjacent the conveyor system infeed 109 until the angle α desired is achieved. Additionally, the transition series 160 of the rollers 112 are disposed intermediate the series 150 of the rollers 112 adjacent the conveyor system exit 111 and the skewed series 170 of rollers 112. The transition series 160 of the rollers 112 are subsequently disposed at 2 degree decreasing angles, with respect to the direction of travel, from the skewed series 170 of the rollers 112 to the series 150 of the rollers 112 adjacent the conveyor system exit 111 until the rollers 112 in the skewed series 170 are substantially perpendicular to the direction of travel. Furthermore, a transition series from transitioning from the arcuate section 180 to the linear section 190 may be required where subsequent ones of the rollers 112 are disposed at increasing or decreasing increments of 2 degrees depending on the application. The 2 degree increment is a calculated degree that assures proper tensioning of the torque transmitters 124 between the adjacent ones of the rollers 112.

The conveyor system 110 of the embodiment shown in FIG. 8 is configured in a merge alignment configuration. However, it is understood an edge alignment configuration or a dual edge alignment configuration can be contemplated, if desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A conveyor system comprising:
a drive assembly;
a plurality of rollers configured to singulate a plurality of conveyed articles travelling on the plurality of rollers along a direction of travel, each of the plurality of rollers having a drive end and a base end, the drive end having a drive sheave including at least three grooves and at least three peaks interposed between the at least three grooves formed on a surface thereof, the drive assembly coupled to the drive end of at least one of the plurality of rollers by a drive belt, at least a first portion of the plurality of rollers disposed at an angle greater than or less than 90 degrees with respect to the direction of travel;
a frame assembly having a first side, a second side, a conveyor system infeed, and a conveyor system exit, the plurality of rollers coupled to the frame assembly; and
a plurality of torque transmitters having at least three peaks engaging the at least three grooves of the drive end of the plurality of rollers.

2. The conveyor system of claim 1, wherein a first one of the at least three peaks of each of the plurality of rollers is offset from a first one of the at least three peaks of an adjacent one of the plurality of rollers by a number of the at least three peaks of each of the plurality of rollers.

3. The conveyor system of claim 1, wherein the angle is calculated by a formula including at least a number of the at least three peaks between the first one of the at least three peaks of each of the plurality of rollers and the first one of the at least three peaks of the adjacent one of the plurality of rollers.

4. The conveyor system of claim 1, wherein the angle is calculated by a formula including at least a distance between adjacent ones of the at least three peaks.

5. The conveyor system of claim 1, wherein the angle is calculated by a formula including at least a distance between centers of adjacent ones of the rollers.

6. The conveyor system of claim 1, wherein the drive ends of the plurality of rollers are coupled to a bracket assembly, the bracket assembly including a support member receiving a portion of the drive ends and including a plurality of angled surfaces configured to face the drive ends of the plurality of rollers, the plurality of angled surfaces disposed at the angle with respect to the direction of travel.

7. The conveyor system of claim 6, wherein the plurality of rollers have a shaft extending outwardly from the drive ends and the base ends thereof, and wherein the support member includes a plurality of recesses formed therein for receiving the shaft of the plurality of rollers.

8. The conveyor system of claim 7, wherein the bracket assembly includes a cover plate coupled to the support member and configured to cover the shaft of the plurality of rollers received in the plurality of recesses.

9. The conveyor system of claim 1, wherein a second portion of the plurality of rollers adjacent the conveyor system infeed and the conveyor system exit is disposed substantially perpendicular to the direction of travel.

10. The conveyor system of claim 9, wherein a third portion of the plurality of rollers intermediate the first portion of the plurality of rollers and the second portion of the plurality of rollers is disposed at successively increasing or decreasing angles of two degree increments with respect the direction of travel.

11. The conveyor system of claim 1, wherein a guard covers the drive ends of the plurality of rollers, wherein the guard has a contour corresponding to an outer surface of each of the plurality of rollers.

12. The conveyor system of claim 1, wherein the plurality of rollers is arranged in one of an edge alignment configuration, a merge alignment configuration, and a dual edge alignment configuration.

13. A conveyor system comprising:
a drive assembly;
a frame assembly having a first side, a second side, a conveyor infeed, a conveyor exit, and a guide edge formed at the first side thereof;
a first row of a plurality of rollers rotatingly mounted at preset intervals within the frame assembly, the first row of the plurality of rollers configured to singulate a plurality of conveyed articles travelling on the first row of the plurality of rollers along a direction of travel, each roller of the first row of the plurality of rollers having a drive end and a base end, the drive end having a drive sheave including at least three grooves and at least three peaks interposed between the at least three grooves formed on a surface thereof, the drive assembly coupled to the drive end of at least one roller of the first row of the plurality of rollers by a drive belt, at least a first portion of each roller of the first row of the plurality of rollers disposed at an angle greater than or less than 90 degrees with respect to the direction of travel; and
a plurality of torque transmitters having at least three protuberances engaging the at least three grooves of the drive end, wherein each of the torque transmitters are disposed at an angle greater than or less than 180 degrees with respect to the direction of travel and the first side of the frame assembly.

14. The conveyor system of claim 13, further comprising a second row of a plurality of rollers rotatingly mounted at preset intervals within the frame assembly, at least a first portion of the second row of the plurality of rollers disposed at an angle greater than or less than 90 degrees and sloped in an opposite direction from the at least the first portion of the second row of the plurality of rollers.

15. The conveyor system of claim 14, wherein the first row of the plurality of rollers and the second row of the plurality of rollers is arranged in a merge alignment configuration, wherein the first row of the plurality of rollers extends from the first side of the frame assembly to a portion of the frame assembly intermediate the first side and the second side of the frame assembly and the second row of the plurality of rollers extends from the second side of the frame assembly to the portion of the frame assembly intermediate the first side and the second side of the frame assembly, and wherein the first row of the plurality of rollers and the second row of the plurality of rollers guide the plurality of conveyed articles towards the portion of the frame assembly intermediate the first side and the second side.

16. The conveyor system of claim 13, wherein a first one of the first row of the plurality of rollers adjacent the conveyor infeed is disposed at an angle substantially parallel to the conveyor infeed and substantially perpendicular to the direction of travel, and wherein a second one of the first row of the plurality of rollers adjacent the conveyor exit is disposed at an angle substantially parallel to the conveyor exit and substantially perpendicular to the direction of travel.

17. A conveyor system comprising:
a frame assembly having a first side and a second side;
a plurality of rollers coupled to the frame assembly and extending between the first side and the second side, a portion of each of the plurality of rollers having at least three grooves and at least three peaks interposed between the at least three grooves formed on a surface thereof, the plurality of rollers disposed at an angle greater than or less than 90 degrees with respect to the first side of the frame assembly; and
a plurality of torque transmitters having at least three protuberances formed thereon, the at least three protuberances of each of the plurality of torque transmitters engaging and aligning with the at least three grooves of one of the plurality of rollers and the at least three grooves of an adjacent one of the plurality of rollers.

18. The conveyor system of claim 17, wherein the at least three grooves and the at least three protuberances have a V-shaped cross-section, and wherein the number of the at least three grooves on each of the plurality of rollers is one of 9 and 17.

19. The conveyor system of claim 17, wherein the angle is between a range of 10 degrees and 25 degrees.

20. The conveyor system of claim 17, wherein the portion of each of the plurality of rollers having the at least three grooves and the at least three peaks is formed at a drive end thereof, and wherein the drive end of a first one of the plurality of rollers is directly engaging a drive system to directly drive the first of the rollers and consecutive ones of the plurality of rollers with respect to the first one of the plurality of rollers are indirectly driven by the drive system via the plurality of torque transmitters.

* * * * *